United States Patent [19]

Inagaki et al.

[11] Patent Number: 4,834,219
[45] Date of Patent: May 30, 1989

[54] OIL PUMP FOR INTERNAL COMBUSTION ENGINE DISPOSED CONCENTRICALLY ABOUT THE TRANSMISSION MAINSHAFT

[75] Inventors: Takashi Inagaki; Kouji Okazaki; Tsugio Ikeda, all of Saitama, Japan

[73] Assignee: Honda Giken Kogyo Kabushiki Kaisha, Tokyo, Japan

[21] Appl. No.: 121,883

[22] Filed: Nov. 17, 1987

[30] Foreign Application Priority Data

Nov. 19, 1986 [JP] Japan .................. 61-275754

[51] Int. Cl.4 ............................... F01M 1/04
[52] U.S. Cl. ..................... 184/6.5; 184/6.12; 184/31
[58] Field of Search ............. 184/6.12, 6.28, 26, 184/31, 6.5; 123/198 C, 196 R; 418/61.3

[56] References Cited

U.S. PATENT DOCUMENTS

| 1,960,512 | 5/1934 | Roos et al. ............ 184/6.12 X |
| 2,475,242 | 7/1949 | Iavelli .................. 184/6.12 X |
| 4,185,717 | 1/1980 | Ford, Jr. et al. ........ 184/6.28 |

FOREIGN PATENT DOCUMENTS

| 59-64415 | 4/1984 | Japan . |
| 0023838 | 1/1987 | Japan .................. 184/6.28 |

Primary Examiner—Leonard E. Smith
Assistant Examiner—Leonard P. Walnoha
Attorney, Agent, or Firm—Lyon & Lyon

[57] ABSTRACT

An oil pump organization for an internal combustion engine is described in which the pump rotor is operatively connected to a transmission gear shaft in order to eliminate the need for a pump drive shaft and to thereby reduce engine space requirements.

15 Claims, 12 Drawing Sheets

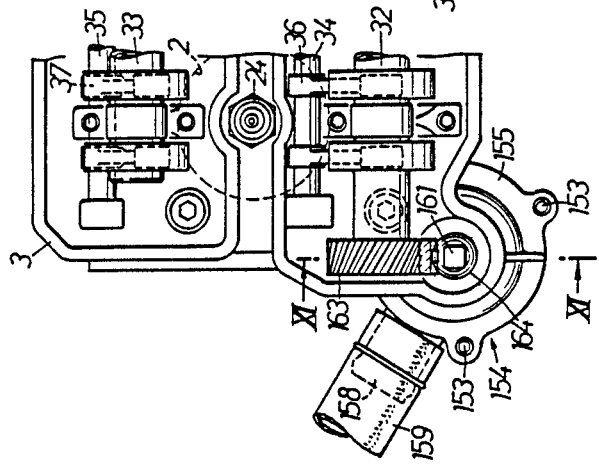

OIL PUMP FOR INTERNAL COMBUSTION ENGINE DISPOSED CONCENTRICALLY ABOUT THE TRANSMISSION MAINSHAFT

BACKGROUND OF THE INVENTION

The present invention relates to oil pump apparatus for internal combustion engines. More particularly, the invention relates to an oil pump apparatus organization having reduced space requirements as compared with oil pump apparatus heretofore known in the art.

Oil pump apparatus is conventionally integrated into the drive systems of internal combustion engines. One such conventional oil pump apparatus is described in Japanese Utility Model Laid-Open Publication No. 59-64415 (No. 64415/1984). In the described arrangement, the oil pump employs a dedicated drive shaft for driving the pump rotor. Since the dedicated oil pump drive shaft must be disposed in parallel relation to the crankshaft and to the transmission gear shafts, the space requirements for the engine are increased.

It is to the amelioration of this problem to which the present invention is directed.

SUMMARY OF THE INVENTION

It is accordingly an object of the present invention to develop a more compact internal combustion engine design by providing an oil pump apparatus arrangement in which the pump rotor drive shaft is combined with a transmission gear shaft thereby eliminating the need for a dedicated oil pump drive shaft.

In order to attain the above object, the present invention is characterized in that an oil pump is provided on a partition wall of the engine transmission case that supports the input shaft of the transmission, and that the oil pump rotor is rotatably supported on the input shaft so as to operatively connect with the crankshaft.

By means of this arrangement, the input shaft of the transmission is imparted with the additional function of serving as a pump shaft supporting the oil pump rotor. The rotor, arranged as described, is always driven from the crankshaft, during driving operation of the engine.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 10 is a cross sectional view taken along line X—X in FIG. 1;

FIG. 11 is a cross sectional view taken along line XI—XI in FIG. 10;

FIG. 12 is a cross sectional view taken along line XII—XII in FIG. 11;

DETAILED DESCRIPTION OF THE PREFERRED EMBODIMENT

Figure 1:
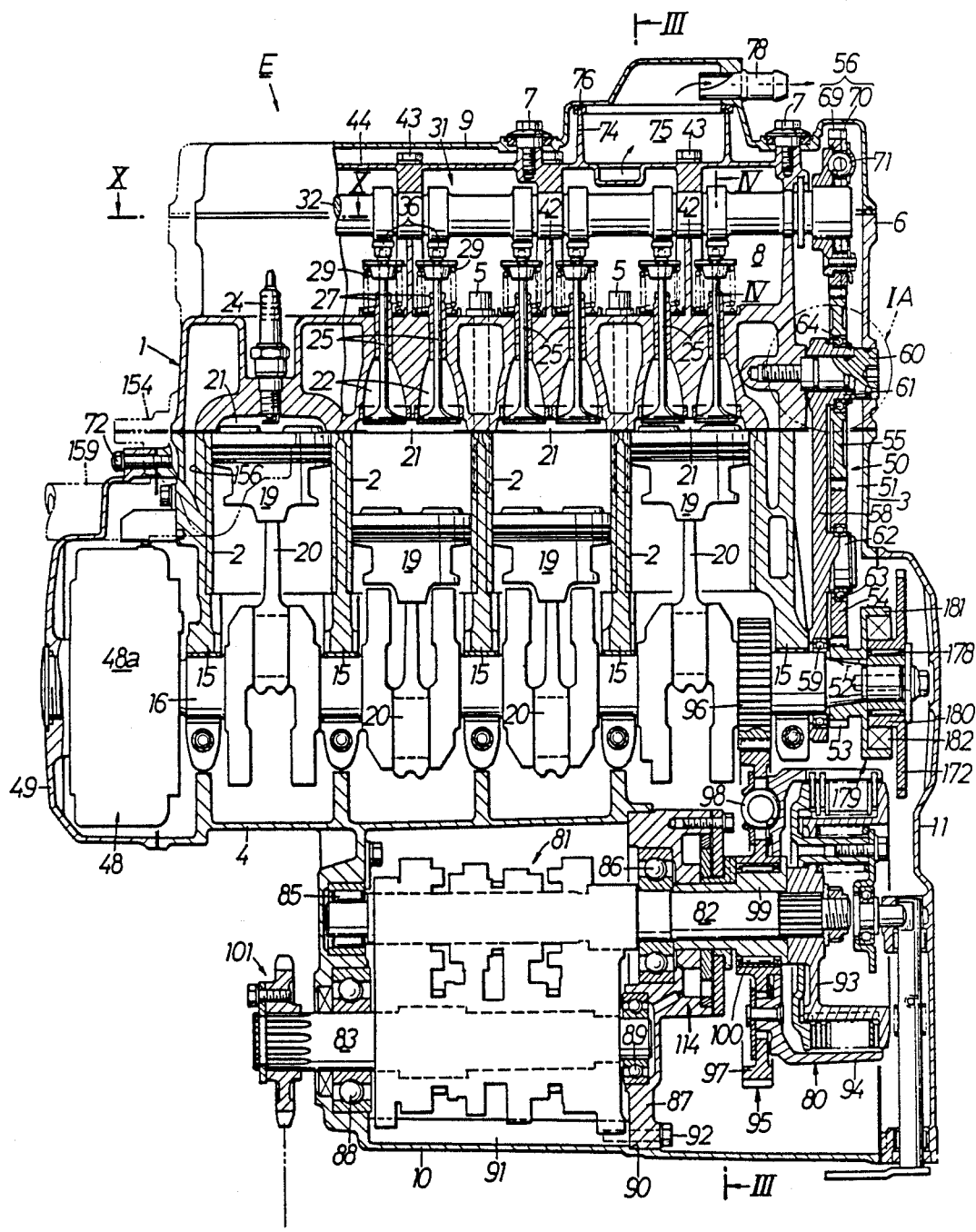
FIG. 1 is a sectional elevational view taken along line I—I of FIG. 3 illustrating a motorcycle engine according to a preferred embodiment of the present invention.

The description that follows is directed first to the general structure of an engine and, thereafter, sequentially to a valve motion device, a timing transmission device, a breather device, a clutch, a transmission, a change mechanism, a lubricating device, a cooling device and a starting device.

First, FIGS. 1 to 4 depict an engine E for a motorcycle. The terms "front" and "rear" and "left" and "right" in regard to the engine E are as regards the orientation of the vehicle.

An engine body 1 of the engine E is provided with main components that include: a cylinder block 3 provided with four cylinders 2, 2, which are connected in series in the left and right directions and which are slanted somewhat forwardly; a crank case 4 integrally formed at a lower end of the cylinder block 3; a cylinder head 6 which is superposed on an upper end surface of the cylinder block 3 and which is fixed by bolts 5; a head cover 9 which is superposed on an upper end surface of the cylinder head 6 and which is fixed to a cam holder 47 mentioned hereinafter by a bolt 7 so as to define a valve motion chamber 8 between the head cover and the cylinder head 6; and a transmission case 10 which is integrally formed at the rear of the crank case 4. The three aforementioned members, that is, the cylinder block 3, the crank case 4 and the transmission case 10 are integrally formed from a casting. Right side surfaces and lower surfaces of the crank case 4 and the transmission case 10 are open, and a side cover 11 and an oil pan 12 are fixed on their open ends by bolts 13, 14.

On a wall of the crank case 4 are integrally formed a partition wall between the respective cylinders 2, 2 and aligned crank journal supporting walls 15, 15 perpendicular to the outside walls of the cylinders 2, 2 at both outside positions. A crankshaft 16 positioned in the crankcase 4 is rotatably mounted between the crank journal supporting walls 15, 15 and a crank holder 18 fixed by bolts 17, 17 at the lower ends of the crank journal supporting walls. The crankshaft 16 is operatively connected to pistons 19, 19 movable in the cylinders 2, 2 through the intermediary of connecting rods 20, 20.

On a lower surface of the cylinder head 6 are provided a plurality of combustion chambers 21, 21 in alignment with the cylinders 2, 2. A ceiling surface of each combustion chamber 21 is formed in a crown shape having a ridgeline parallel to the crankshaft 16. At one slant surface of the crown shape are opened inner ends of a pair of intake ports 22, 22 aligned along the ridgeline and at the other slant surface of the crown shape are opened the inner ends of a pair of exhaust ports 23, 23 aligned along the ridgeline. Outer ends of the intake ports 22, 22 open to the rear of the cylinder head 6 and outer ends of the exhaust ports 23, 23 open to the front of the cylinder head 6.

An ignition plug 24 for each combustion chamber 21 is arranged to be surrounded by the aforesaid intake and exhaust ports 22, 22; 23, 23 and is threadedly screwed to the cylinder head 6.

The intake valve 25 and the exhaust valve 26 that open and close each intake port 22 and each exhaust port 23 are slidingly guided for moving up and down by valve guides 27 and 28 fixedly provided on the cylinder head 6 and so arranged that the distance between both valves 25 and 26 increases toward the valve head.

On the intake and exhaust valves 25 and 26 are mounted valve springs 29 and 30 biasing the valves in their closing direction. In order to open the intake and exhaust valves 25 and 26 against forces of these valve springs 29 and 30, a valve motion device 31 is provided in the combustion chamber 8.

The valve motion device 31 comprises an intake camshaft 32 which is arranged just above the intake valves 25, 25 along the direction of alignment of the group of intake valves 25, 25; an exhaust camshaft 33 which is arranged just above the exhaust valves 26, 26 along the direction of alignment of the group of exhaust valves 26, 26; a rockable intake cam follower 36 which is supported on the cylinder head 6 by a pivot pin 34 at a base end thereof and which is inserted between the intake camshaft 32 and a head of each intake valve 25 at a free end thereof; and a rockable exhaust cam follower 37 which is supported on the cylinder head 6 by a pivot pin 35 at a base end thereof and which is inserted between the exhaust camshaft 33 and a head of each exhaust valve 26 at a free end thereof.

Figure 3:
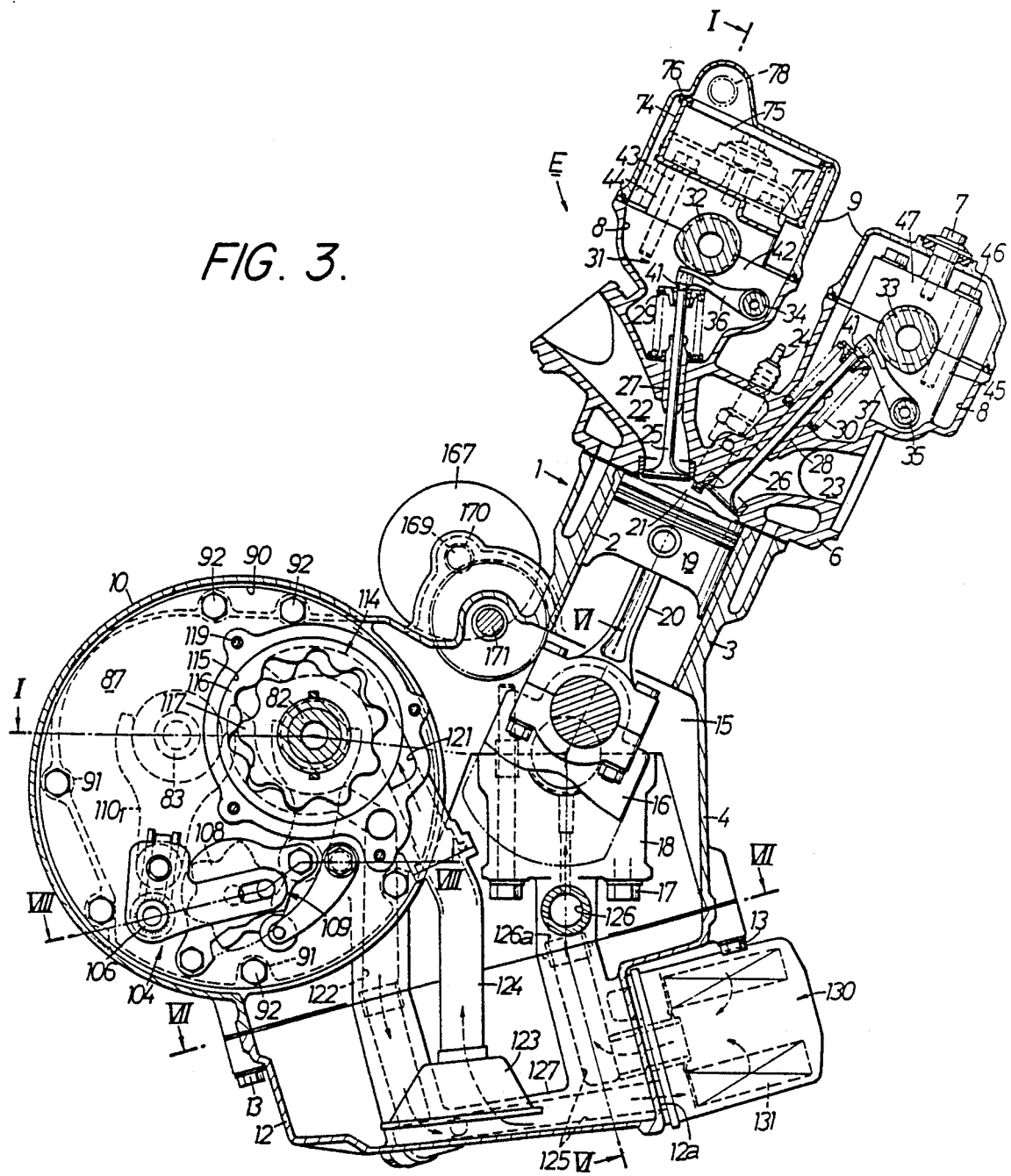
FIGS. 3 and 4 are cross sectional views taken along line III—III and line IV-IV of FIG. 1.

As shown in FIG. 3, the pivot pin 34 of the intake cam follower 36 is arranged between the exhaust valve 25 and the ignition plug 24, and the pivot pin 35 of the exhaust cam follower 37 is arranged between the exhaust valve 26 and the exhaust port 23. When thus constituted, the intake port 22 can extend upwardly from the combustion chamber 21 without interferring with the intake cam follower 36, so as not to restrict intake flow. Also, a sufficient space can be provided above the ignition plug 24 in order to attach and detach it without interferring with the exhaust cam follower 37.

Figure 4:
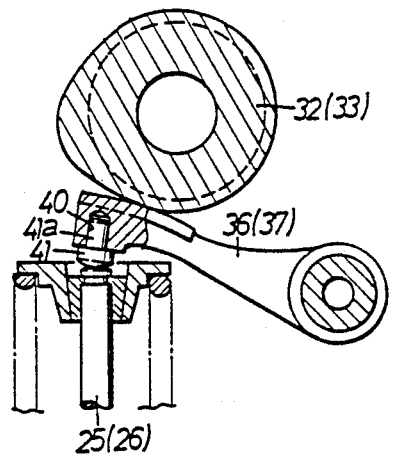

As shown in FIG. 4, supporting bore 40 is provided in the lower surface of the free end of each cam follower 36, 37. Into this supporting bore 40 is loosely fitted a projecting shaft 41a which protrudes via a shim facing to the head of each of the corresponding intake and exhaust valve 25, 26. By selecting the thickness of the shim 41, the valve head gap of each intake and exhaust valve 25 and 26 is properly adjusted. Lateral deviation of the shim 41 is prevented by properly fitting the projecting shaft 41a within the supporting bore 40.

The intake camshaft 32 is rotatably interposed between a plurality of cam journal supporting walls 42, 42 provided upstanding from a bottom wall of the valve motion chamber and a cam holder 44 integral with the cam journal supporting wall fixed to the latter by bolts 43, 43. Also, the exhaust camshaft 33 is rotatably interposed between a plurality of cam journal supporting walls 45, 45 upstanding from the bottom wall of the valve motion chamber 8 and a cam holder 47 integral with the cam journal supporting wall fixed to the latter by bolts 46, 46.

These intake and exhaust camshafts 32 and 33 are connected with the crankshaft 16 through the intermediary of a timing transmission device 50.

Figures 1A, 2:
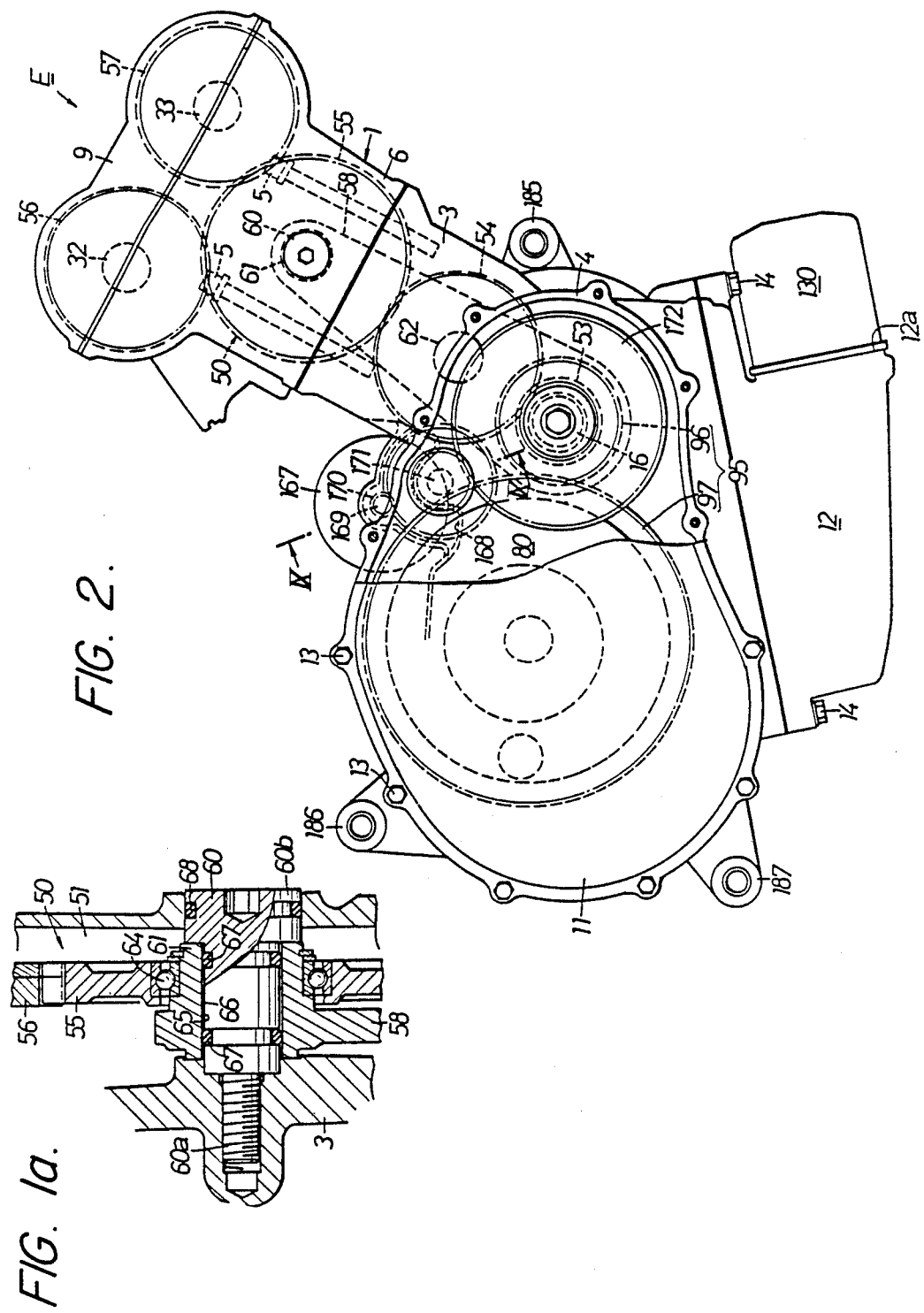
FIG. 1A is an enlarged cross sectional view illustrating a portion 1A in FIG. 1.
FIG. 2 is a right side view of the engine of FIG. 1.

The timing transmission device 50, as shown in FIGS. 1, 1A and 2, is contained in a timing transmission chamber 51 formed at the right end portions of the cylinder block 3, the cylinder head 6 and the head cover 9. The timing transmission device 50 comprises a drive gear 53 fixed to the right end portion of the crankshaft 16 through the intermediary of a key 52; a first idler gear 54 meshing with the drive gear 53; a second idler gear 55 which meshes with the first idler gear 54; an intake driven gear 56 which is substantially secured to a right end portion of the intake camshaft 32 and which meshes with the second idler gear 55; an exhaust driven gear 57 which is substantially secured to the right end portion of the exhaust camshaft 33 and which similarly meshes with the second idler gear 55; and a supporting plate 58 which supports the first and second idler gears 54 and 55 with bolts. The timing transmission device 50 is designed to transmit a rotation of the crankshaft 16 to both camshafts 32 and 33 with a reduction ratio of $\frac{1}{2}$.

The aforesaid supporting plate 58 is pivotably mounted on the crankshaft 16 at one end thereof through the intermediary of a ball bearing 59 and is supported by a bearing shaft 60 which is threadedly screwed into the cylinder head 6. On the right side surface of the supporting plate 58 are provided a pair of outwardly projecting upper and lower bosses 61 and 62 on which the respective first and second idler gears, 54, and 55, are supported through the intermediary of the respective ball bearings 63 and 64.

As shown in FIG. 1A, a certain gap 66 in the form of an annular clearance space is provided between the bearing shaft 60 and an axial bore 65 provided in the supporting plate 58 to allow the bearing shaft 60 to penetrate therethrough. In order to restrain an oscillation of the supporting plate 58 due to the gap 66, resilient rings 67, 67, as, for example, O-rings, are disposed on the bearing shaft 60 as a pair of resilient spacer members contacting the inner surface of the axial bore 65.

Further, in the embodiment shown, the upper boss 61 and the axial bore 65 are concentrically arranged to render the supporting plate 58 more compact, but this construction is not necessary.

The bearing shaft 60 is threadedly screwed into an inner side wall of the timing transmission chamber 51 by a threaded portion 60 of the leading end thereof and is supported on an outer side wall of the chamber 51 by a circular head portion 60b through the intermediary of an O-ring 68. Accordingly, the bearing shaft 60 is supported at both ends.

In the aforesaid structure, the engine body 1 is formed of aluminum alloy, and the supporting plate 58 and the driver gear 53, as well as the driven gears 56 and 57, are formed of a material comprising iron compounds. Accordingly, the engine body 1 and the timing transmission device 50 differ largely in their thermal expansion coefficient. Further, during driving of the engine E, the engine body 1 is subject to greater amounts of heat than is the timing transmission device 50. Accordingly, the engine body E undergoes a greater degree of thermal expansion than does the timing transmission device 50. Therefore, if the distance between the crankshaft 16 and the bearing shaft 60 increases, since the bearing shaft 60, in moving, presses and deforms the resilient rings 67 and 67 within the gap 66 between the bearing shaft 60 and the axial bore 65 of the supporting plate 58, the aforesaid thermal expansion does not affect on the supporting plate 58. Consequently, the thermal expansion undergone by the engine E does not affect the distance between the shafts of the first and second idler gears rotatably supported on the supporting plate 58 or the distance between the shaft of the drive gear 53 on the crankshaft 16 and the first idler gear 54. Therefore, the backlash between the gears 53, 54 and 55 is always maintained substantially constant whereby the driving torque can be adapted to be properly and quietly transmitted by these gears from the crankshaft 16 to both camshafts 32 and 33.

Further, although the thermal expansion of the cylinder head 6 will have an affect on the backlash between the second idler gear 55 and the intake and exhaust driven gears 56 and 57, since the distance between the shafts mounting these gears is relatively short, the affect of this expansion can be expected to be very small. However, in the described device, in order to avoid the affect of thermal expansion, each of the driven gears 56 and 57 is divided into a stationary gear 69 substantially fixed to corresponding camshafts 32 and 33 and a movable gear 70 connected to the stationary gear 69 through the intermediary of a torsion spring 71. The teeth of the second idler gear 55 are resiliently interposed between the teeth of both gears 69 and 70 due to torsion force of the torsion spring 71 whereby it is intended to always exclude the backlash.

Figure 15:
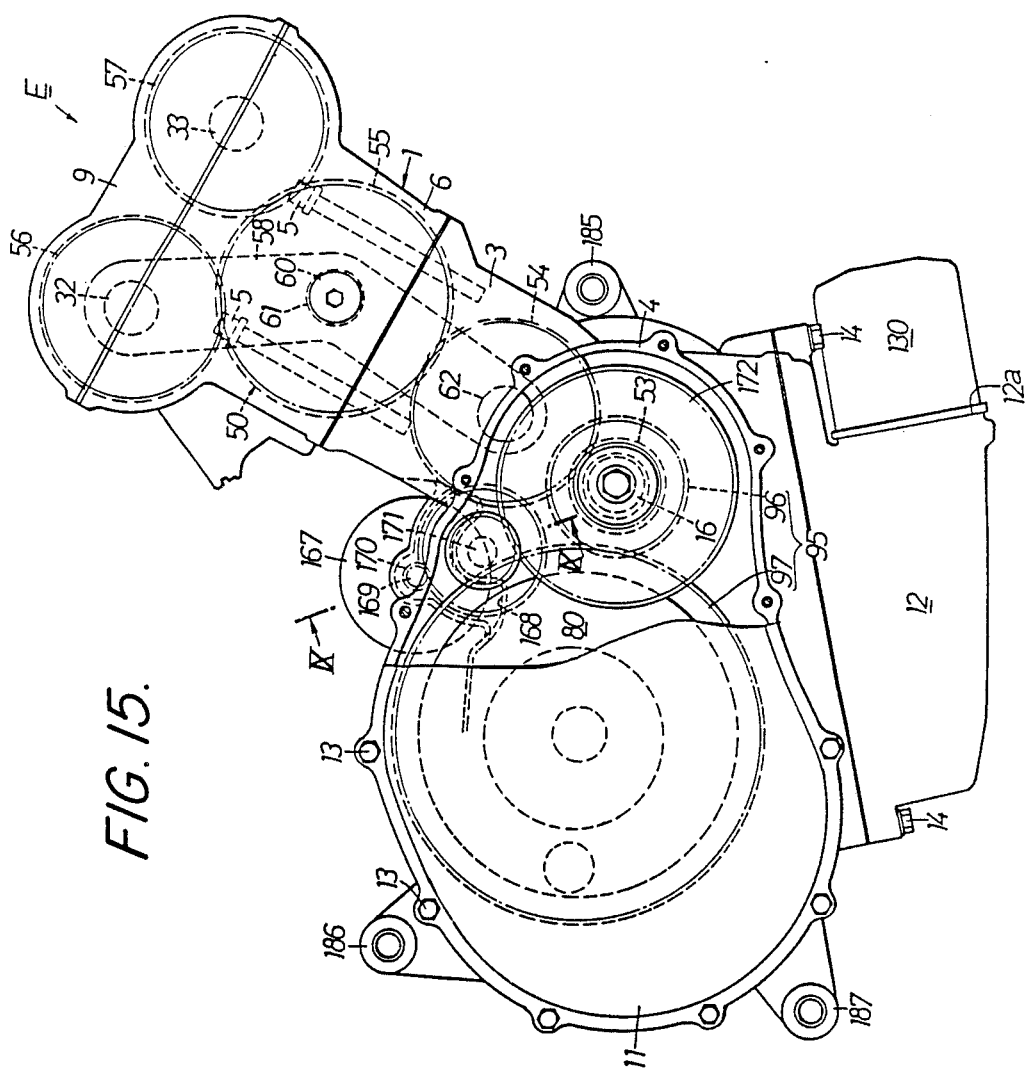
FIG. 15 is a side view corresponding to FIG. 2 illustrating a variant of the engine according to the present invention.

In the present invention, as shown in FIG. 15, the pivot shaft pivotably mounting one end of the supporting plate 58 may be formed as an intake camshaft 32 or an exhaust camshaft 33. In this case, it is unnecessary to provide the above described backlash-excluding mechanism between the second idler gear 55 and the intake drive gear 56 or the exhaust driven gear 57. However, it is desirable to provide the backlash-excluding mechanism between the drive gear 53 and the first idler gear 54.

Again, in FIG. 1, the left end portion of the crankshaft 16 projects into the crank case 4. On the projecting end is fixed a rotor 48a of a generator 48. A side cover 49 provided with its stator is fixed to the crank case by a bolt 72.

Next, a description is made about the breather device. As shown in FIGS. 1 and 3, on an upper surface of the cam holder 44 of the intake camshaft 32 side is integrally formed a surrounding wall 74 extending around a portion of the cam holder. In order to use the interior of the surrounding wall 74 as a breather chamber 75, the head cover 9 is made to abut an upper end of the surrounding wall 74 through the intermediary of a sealing member 76. The breather chamber 75 communicates with the valve motion chamber 8 through the intermediary of a bore 77 provided on the cam holder 44 and also communicates with the intake system of the engine E or the atmosphere through the intermediary of an introducing pipe 78 provided in the head cover 9.

Thus, when the breather chamber 75 is constructed by a part of the cam holder 44 and the head cover 9, it is unnecessary to provide an exclusive and independent breather chamber body thereby enabling the simplification of the structure of the breather device. Thus, during operation of the engine E, blow-by gas generated in the crank case 4 transfers to the valve motion chamber 8 through the timing transmission chamber 51, by entering from the bore 77 into the breather chamber 75 and expanding into the latter. After an oil fraction is separated in the breather chamber 75, the blow-by gas is discharged from the chamber 75 through the introducing pipe 78. The oil separated from the gas drops from the bore 77 into the valve motion chamber 8.

Figure 5:
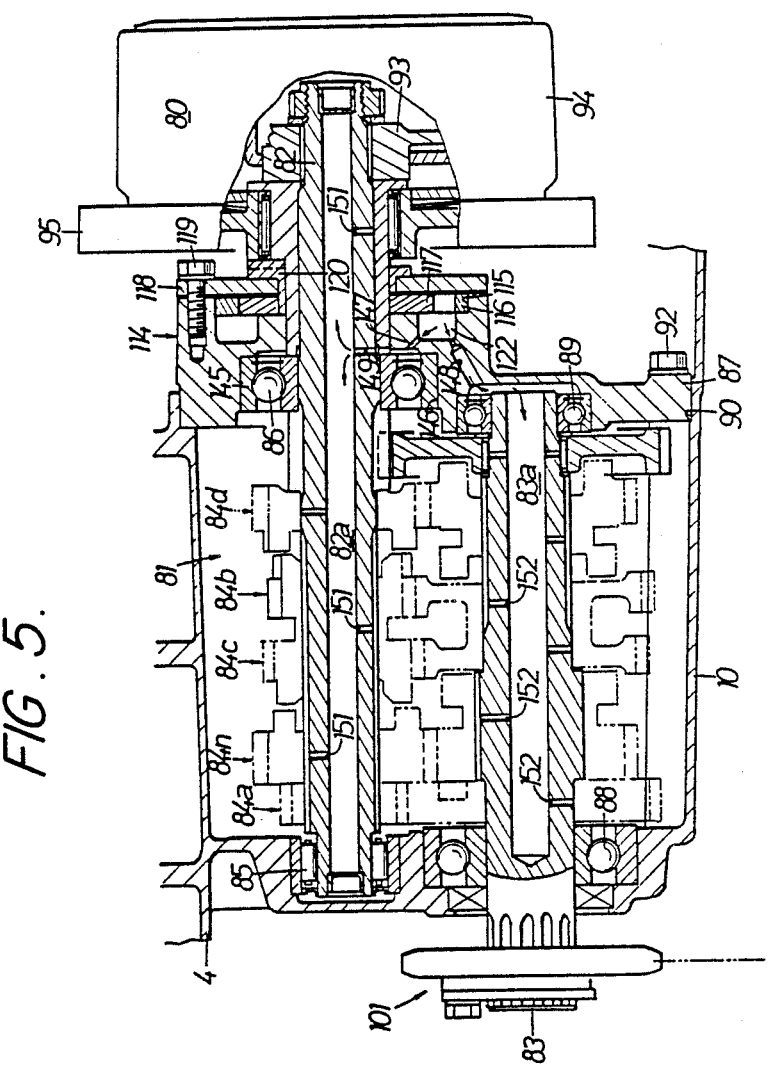
FIG. 5 is an enlarged cross sectional view illustrating in greater detail the clutch and transmission of FIG. 1.
Figure 6:
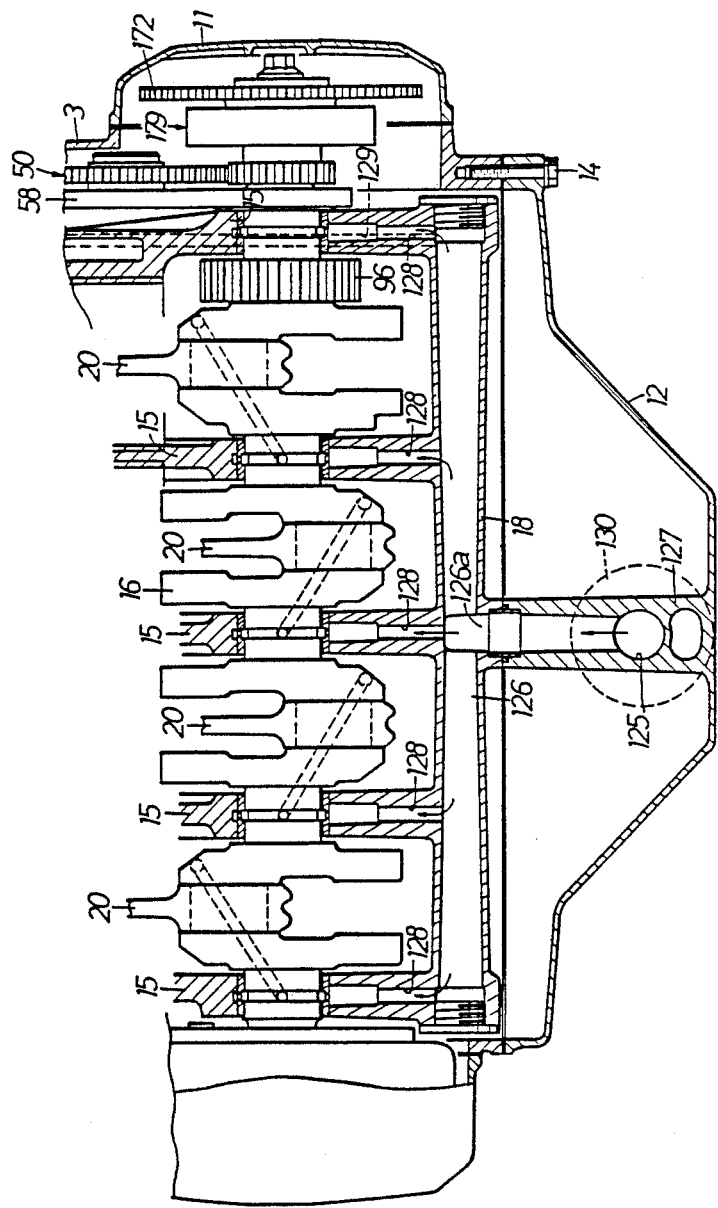
FIGS. 6, 7 and 8 are cross sectional views taken along lines VI—VI, VII—VII and VIII—VIII of FIG. 3, respectively.
Figure 7:
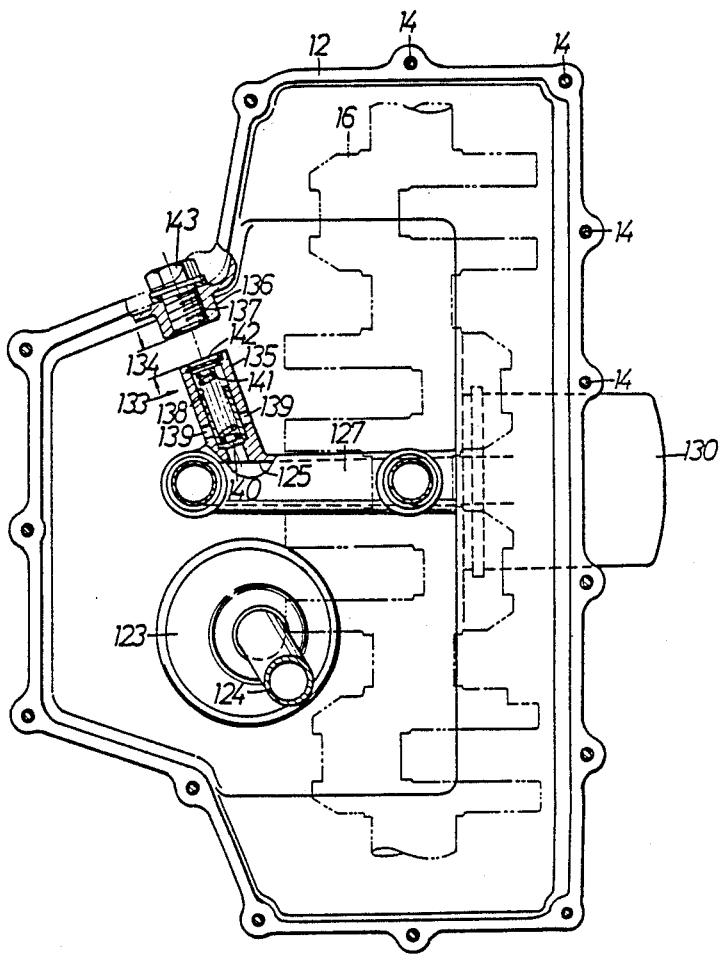

Next is presented a description of the clutch and the transmission. As shown in FIG. 1 and FIG. 5, in the transmission case 10 are contained the clutch 80 and the transmission 81. An input shaft 82 and an output shaft 83 of the transmission 81 are arranged parallel to the crankshaft 16, and between both the shafts 80 and 83 is provided a multistage transmission gear train consisting of gears 84a to 84n. Left end portions of the input and output shafts 82 and 83 are supported on the left side wall of the transmission case 10 through the intermediary of a needle bearing 85 and a ball bearing 88. Right end portions of the input and output shafts 82 and 83 are supported on a partition plate 87 at the middle portion of the transmission case 10 through the intermediary of ball bearings 86 and 89.

The aforesaid partition plate 87 is of circular shape and is fitted into an annular step portion 90 formed on an inner peripheral surface of the transmission case 10. The plate 87 is detachably fixed to a plurality of bosses 91, 91 formed on a peripheral wall of the case 10 by bolts 92, 92.

The right end portion of the input shaft 82 extends through the partition plate 87 and on its leading end is fixed a clutch inner 93 of the clutch mechanism 80. A clutch outer of the clutch mechanism 80 is connected to the crankshaft 16 through the intermediary of a primary reduction device 95. The latter is comprised of a drive gear 96 of small diameter fixed on the crankshaft 16, and a driven gear 97 of large diameter attached to one side surface of the clutch outer 94 via a torque damper 98 and meshing with the drive gear 96. The driven gear 97 is supported on a spacer sleeve 99 on the input shaft 82 through the intermediary of a needle bearing 100. Thus, the clutch outer 94 is rotatably supported on the input shaft 82 through the intermediary of the driven gear 97. With such a structure the assembling performance is better and it is possible to confirm an actuation of the transmission 81 before assembling it into the transmission case 10 since the transmission 81 can be assembled on the partition plate 87 before fixing the partition plate 87 to the transmission case 10.

Thus, during driving of the engine E, the output of the crankshaft 16 is transmitted to the clutch outer 94 via the drive gear 96 and the driven gear 97. During a connecting condition of the clutch 80, the resulting output torque is transmitted to the input shaft 82 via the clutch inner 93, and further, is transmitted to the output shaft 83 through the intermediary of one gear train selected from the transmission gear trains 84a to 84n. Output torque of the output shaft 83 is transmitted to the rear wheels of the motorcycle through the intermediary of a second reduction device 101 so as to drive the rear wheels.

Figure 8:
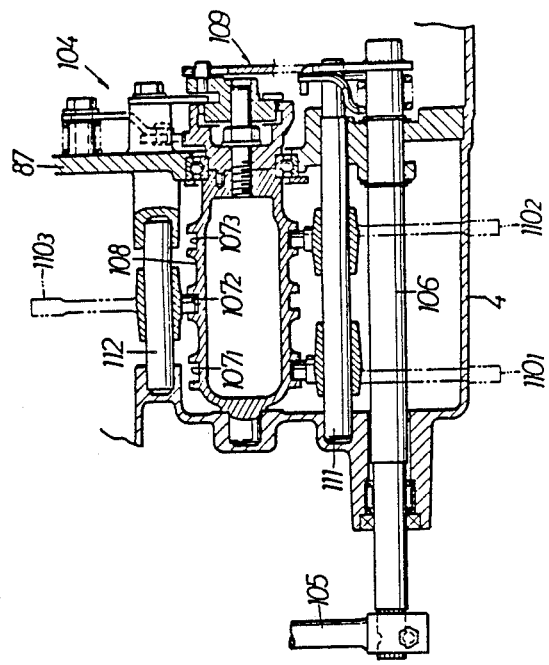
Figure 9:
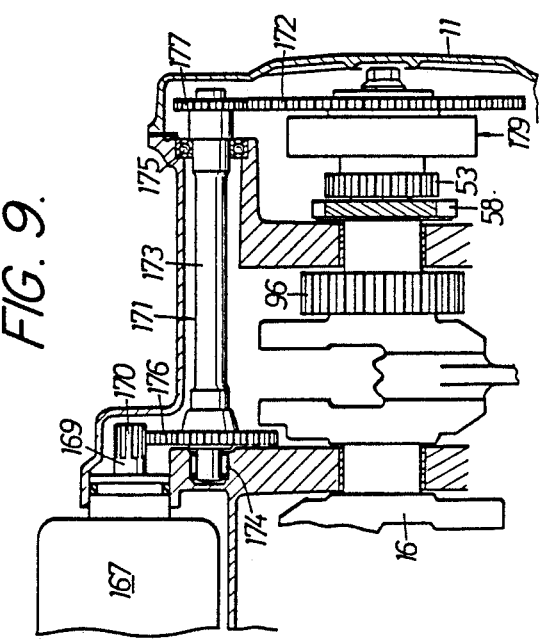
FIG. 9 is a cross sectional view taken along line IX—IX in FIG. 2.

Next presented is a description of a change mechanism for changing and controlling the aforesaid transmission 81. In FIGS. 5 and 8, the change mechanism 104, as is well known, is provided with a change spindle 106 provided with a change pedal 105; a shift drum 108 forming columns of cam grooves $107_{1-107_3}$ on an outer periphery thereof; a step feed mechanism 109 which limits the rotary angle of the change pedal 105 and which gives the shift drum 108 a rotation of a required angle with the rotation of the change pedal 105; several shift forks $110_{1-110_3}$ which are engaged with cam grooves $107_{1-107_3}$ at one end thereof and with a sliding gear in the transmission gear trains 84a–84n at the other end thereof; and fork guides $111_1$, $111_2$ which slidably support the shift forks. All of the change spindle 106, the shift drum 108 and the fork guides $111_{1-111_3}$ are arranged in parallel to the input and output shaft 82 and 83 of the transmission 81 and their opposite end portions are supported on the partition plate 87 and the left side wall of the crank case 4, respectively. With such a structure, before fixing the partition plate 87 to the transmission case 10, since the change mechanism 104 can be assembled on the partition plate 87 together with the transmission 81, the assembling performance is better. Further, it is possible to confirm the actuation of the change mechanism 104 before assembling it into the transmission case 10.

Next, a description of the lubricating device is presented. Firstly, a description is presented of the lubrication systems of the crankshaft 16 and the valve motion device 31 with reference to FIGS. 1, 3, 5, 6 and 7. On the partition plate 87 is provided an oil pump 114 of trochoidal - or rotor - type forming an oil supply source. That is, on the partition plate 87 is formed a pump chamber 115 in facing relation to the driven gear 97 of the primary reduction device 95. In the pump chamber 115 are contained a radially outer rotor 116 and a radially inner rotor 117. On the open end of the pump chamber 115 is fixed a cover plate 118 by bolts 119. The inner rotor 117 is connected to the driven gear 97 through the intermediary of an Oldham's joint 120 penetrating through a center portion of the cover plate 118. By such a structure, during driving of the engine E, since the oil pump 114 can continue to be driven through the intermediary of the first reduction device 95, it is unnecessary to provide a driving gear train exclusively between the crankshaft 16 and the oil pump 114. Also, since the partition plate 87 combines with the pump case to define the pump chamber 115, it is unnecessary to provide an exclusive pump case thereby simplifying the engine structure.

In the partition plate 87 are provided an intake port 121 and and exhaust port 122 opening into the pump chamber 115. To the intake port 121 is connected an intake pipe 124 rising from a strainer 123 provided below an oil surface in the oil pan 12. The exhaust port 122 is communicated with an oil gallery 126 through the intermediary of an oil passage 125. The latter is provided on a protruding portion 127 formed on an inner wall of the oil pan 12. Also, the oil gallery 126 is formed integrally with the crank holder 18 extending along its longitudinal direction. The oil gallery 126 has an inlet 126a connected to the oil passage 125 at a center thereof, the passage area being progressively widened from the inlet 126a toward left and right ends. From the oil gallery 126 are branched a plurality of oil feeding paths 128, 128 leading to a bearing surface to a journal of the crankshaft 16 and one oil feeding path 129 leading to a lubricating portion of the valve motion device 31.

Thus, with actuation of the oil pump 114, lubricating oil in the oil pan is induced through the strainer 123 and is fed under pressure to the oil gallery 126 via the oil passage 125. Further, the lubricating oil is distributed from the oil gallery 126 to portions of the crankshaft 16 and the valve motion device 31 requiring lubrication.

The lubricating oil in the oil pan 16, when passing the oil passage 125, is filtered by an oil filter 130 disposed in front of the oil pan 12. Inside the oil filter 130 is a filler chamber through which the oil passage 125 extends. In the filter chamber is set a filter element 131. Accordingly, oil flowing along the oil passage 125 is fed to the oil gallery 126, after being filtered in the element 131.

The front 12a of the oil pan 12 mounting the oil filter 130 is retracted from the front surface of the crank case 4. By this structure, it is possible to restrict into a small area the oil filter 130 projecting from a front surface of the engine E.

In the oil pan 12 is provided a relief valve 133 which restricts the upper limit of the exhaust pressure of the oil pump 114. On a bottom wall of the oil pan 12 are a pair of coaxially aligned inner and outer bosses 135 and 136 having a required distance 134 therebetween. In the outer boss 136 is provided a drain bore 137, and in the inner boss 135 is provided a valve bore 138 communicating with the oil passage 125 via the bore 137. Also, in this boss 135 is provided a lateral bore 139 opening the valve bore 138 to the oil pan 12. In the valve bore 138 are disposed a piston-like valve body 140 opening and closing the lateral bore 139, and a valve spring 141 biasing the valve body 140 in a direction closing the valve. A stopper ring 142 in the boss 135 supports an outer end of the valve spring 141.

Thus, when the exhaust pressure of the oil pump 114 exceeds the pressure limit set by the loading of the valve spring 141, the valve body 140 retracts by receiving the exhaust pressure and opens the lateral bore 139 thereby discharging the excess pressure from the oil passage 125 to the lateral bore 139 via the valve bore 138.

Into the outer boss 136 is threadedly screwed a drain bolt 143 closing the drain bore 137. The drain bolt 143 combines with a blind plug to close a machining port of the valve bore 138. Thus, when the drain bolt 143 is removed, oil stored in the oil pan 12 can be discharged through the drain bore 137. Due to the distance provided between the bosses 135 and 136, as mentioned above, there is no obstruction to the oil in flowing toward the drain bore 137.

Next, the lubricating system of the transmission 81 is described with reference to FIG. 5. In the diaphragm plate 87 are provided an exhaust port 122 of the pump chamber 115, and a first and second orifice 147 and 148 communicating with bearing housings 145 and 146 which contain the ball bearings 86 and 89 of the input and output shafts 82 and 83 therein. In the input shaft 82 is formed a hollow portion 82a that is closed at both ends, and further, are provided an inlet bore 149 which communicates the hollow portion 82a with the bearing housing 145, and a plurality of oil feeding bores 151, 151 which communicate the hollow portion 82a with sliding and rotating surfaces of the transmission gears on the input shaft 82. Also, in the output shaft 83 is formed a hollow portion 83a opened into the bearing housing 146 at one end thereof and further, are provided a plurality of oil feeding bores 152, 152 which communicate the hollow portion 83a with sliding and rotating surfaces of the transmission gears on the output shaft 83.

Thus, during actuation of the oil pump 114, a portion of the oil exhausted to the exhaust port 122 is fed to the bearing housings 145 and 146 in amounts controlled by the first and second orifices 147 and 148 to be introduced into the hollow portions 82a and 83a of the input and output shafts 82 and 83, respectively. A portion of the oil is distributed to the oil feeding bores 151, 151; 152, 152, respectively to lubricate each portion of the transmission gear trains 84a-84n.

When the lubricating system of the transmission 81 is thus structured, the oil passage connecting the oil pump 114 with the hollow portions 82a and 83a of the input and output shafts 82 and 83 is simplified whereby the oil feeding to the transmission 81 can be effectively performed.

Next, the cooling device is described. As shown in FIGS. 1, 10, 11 and 12, at the left side portions of the cylinder block 3 and the cylinder head 6 are integrally formed a pair of upper and lower housing sections 155a and 155b which are connected to each other by bolts 153 so as to construct a housing 155 of a water pump 154.

In the lower housing section 155b is formed an outflow port 157 which extends to an entrance port of a water jacket 156 surrounding the cylinders 2, 2 from the interior of the housing section 155b. Also present is an inflow pipe 158 opening to the center of the interior of the pump housing 155. To this inflow pipe 158 is connected a water hose 159 that extends to an outlet of a radiator, not shown. Also, the outlet of the water jacket 156 is communicated with an inlet port of the radiator, as is common in the prior art although not shown.

In the pump housing 155 is disposed an impeller 160. A pump shaft 161 driving the impeller 160 is supported on the upper housing section 155a through the intermediary of a pair of upper and lower bearings 162 and 163. This pump shaft 161 is arranged to extend into the valve motion chamber 8 at an upper end thereof. On the upper end of the pump shaft 161 is formed a driven gear 164 which meshes with a drive gear 163 fixedly provided on the intake camshaft 32. By such a structure, since the pump housing 155 of the water pump 154 can be formed by portions of the cylinder block 3 and the cylinder head 6, it is possible to simplify the structure of the water pump 154, and also, it avoids need for a particular piping for connecting between the pump housing 155 and the water jacket 156. Further, since the impeller 160 occupies a position which is relatively close to the camshaft 32, they can be interconnected by a relatively short pump shaft 161.

Next, a description of the starting device is presented. As shown in FIGS. 1, 2, 3 and 9, in consideration of weight distribution of the engine E, the starter motor 167 is connected to the crankshaft 16 at the center portion of the engine E in a depression 168 between the back surface of the cylinder block 3 and the upper surface of the crank case 4. A rotor shaft 169 of the starter motor 167 projects from the right end portion thereof, that is, at the end adjacent the timing transmission device 50. On the projecting end of the rotor shaft 169 is formed a pinion gear 170 which is connected to a ring gear 172 on the right end portion of the crankshaft 16 through the intermediary of a middle gear shaft 171. The middle gear shaft 171 comprises a rotary shaft 173 supported on the crank case 4 by a pair of left and right bearings 174 and 175; a gear 176 of large diameter which is fixedly provided at the left end of the rotary shaft 173 and which meshes with the pinion 170; and a gear 177 of small diameter which is fixedly provided at the right end of the gear shaft 173 and which meshes with the ring gear 172. The rotation of the pinion gear 170 can be transmitted to the ring gear 172 by two stage reduction. By adopting such a middle gear shaft 171, it is possible to make the ring gear 172 of a small diameter whereby it is possible to improve compactness of the engine E.

As clearly shown in FIG. 1, the ring gear 172 is rotatably supported on the crankshaft 16 by a needle bearing 178 and is connected to the crankshaft 16 through the intermediary of an overrunning clutch 179. The overrunning clutch 179 comprises a clutch inner 180 formed by a boss of the ring gear 172; a clutch outer 181 which is provided integrally at one end with the drive gear 53 of the timing transmission device 50 and which at the other end surrounds the clutch inner 180; and a clutch roller 182 which is interposed between the clutch inner 180 and the clutch outer 181. The driving force developed by this arrangement can be transmitted only in one direction from the clutch inner 180 to the clutch outer 181. Accordingly, if the starter motor 167 is actuated to start the engine E, the rotation of the rotor shaft 169 is reduced in the two stages by the middle gear shaft 171 as described above and is transmitted to the ring gear 172. The rotation, further, is transmitted to the crankshaft 16 through the intermediary of the overrunning clutch 179 so as to start the cranking of the crankshaft 16. If the engine E starts and the rotational speed of the clutch outer 181 of the overrunning clutch is higher than that of the clutch inner 180, the clutch is caused by the clutch roller 182 to enter an interrupting condition whereby overrunning of the starter motor 167 is prevented.

Figure 13:
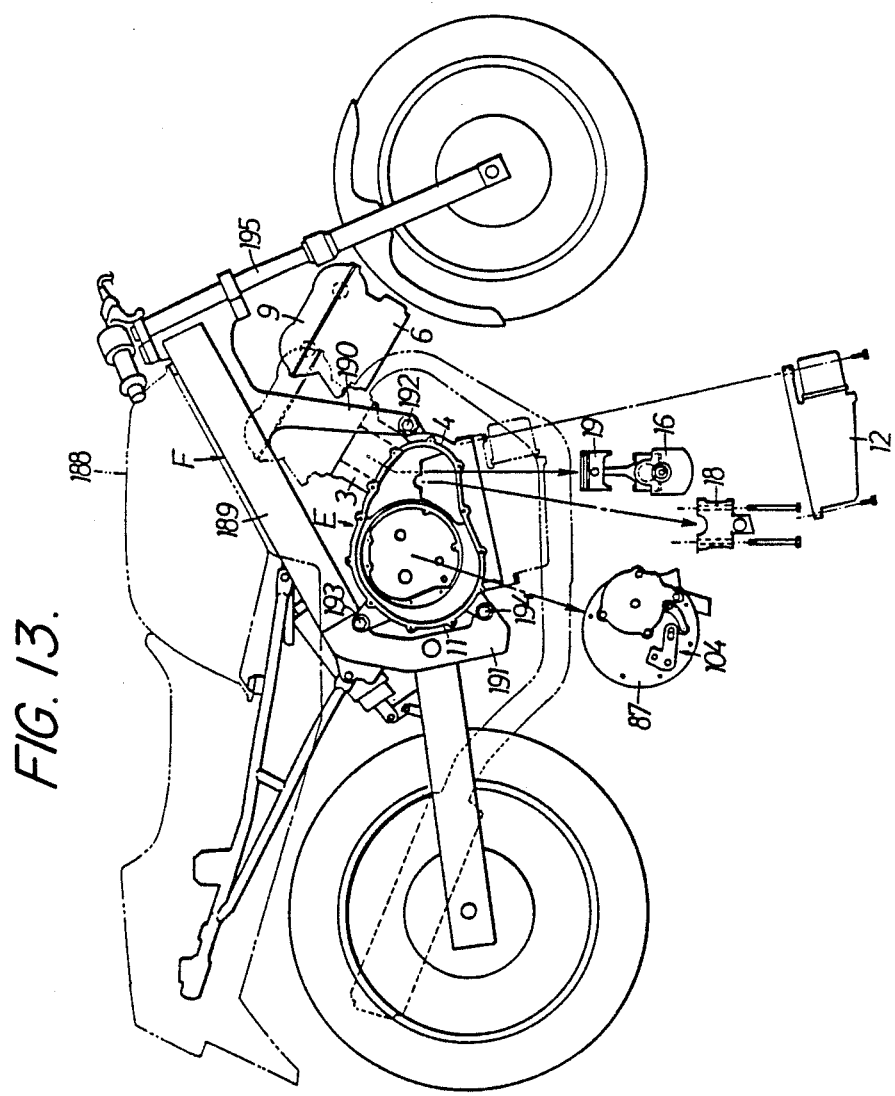
FIG. 13 is a partially exploded side view illustrating the assembly of engine to the motorcycle.
Figure 14:
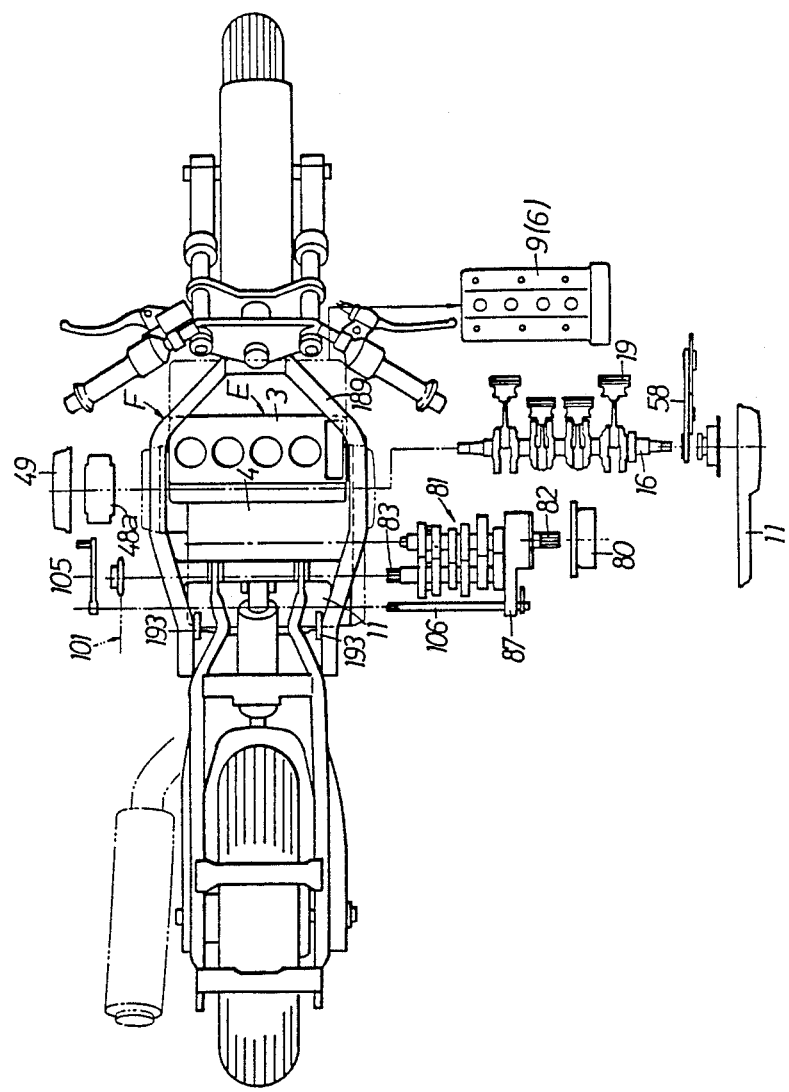
FIG. 14 is a plan view of FIG. 13.

Finally, the structure for mounting the engine E on the motorcycle is described. In FIGS. 2, 13 and 14, the assembly consisting of the integral crank case 4 and transmission case 10 of the engine E has a pair of front hangers 185 integrally projected from its front portion and a pair of upper hangers 186 and lower hangers 187 also integrally projected from its rear portion.

The body frame F of the motorcycle includes a main frame 189 carrying a fuel tank 188 on an upper surface thereof and slanting rearwardly. From this frame F are provided a pair of left and right front brackets 190 and a pair of left and right rear brackets 191. The front hangers 185 are connected to the front bracket 190 by a bolt 192. The upper hangers 186 are connected to an upper portion of the rear bracket 191 by a bolt 193. The lower hangers 187 are connected to a lower portion of the rear bracket 191 by a bolt 194. Thus, the engine E is mounted on the vehicle body frame F.

With such a mounting structure, since the engine E has the structure as previously described, in a condition supporting the assembled body of the crank case 4 and the transmission case 6 on the vehicle body frame F, the crankshaft 16 can be removed downwardly together with the piston 19 and the supporting plate 58. This is performed by opening the left and right side covers 11 and 49 and the oil pan 12; by removing the crank holder 18 downwardly and further, by removing the bearing shaft 60 of the supporting plate 58 laterally. Similarly, the rotor 48a of the generator may be removed previously. Also, the transmission 81 and the change mechanism 104 can be taken out together with the diaphragm plate 87 by one effort, when the latter is taken out laterally after removing the second reduction device 101 from the output shaft 83 of the transmission 81, and removing the change pedal 105 from the change spindle 106.

Also, after removing the head cover 9, the connection between the cylinder head 6 and the cylinder block 3 is released, the cylinder head 6 can be taken out laterally from between the front bracket 190 and the front fork 195.

Accordingly, each of the described parts of the engine E can be attached and detached without removing the entire engine E from the vehicle body frame F, whereby maintenance of the vehicle can be very easily and rapidly performed.

It should be further understood that, although a preferred embodiment of the invention has been illustrated and described herein, changes and modifications can be made in the described arrangement without departing from the scope of the appended claims.

We claim:

1. An internal combustion engine, comprising:
a transmission case having walls including end walls;
a transmission in said transmission case including an input gear shaft journalled for rotation in at least one of said end walls;
a crankshaft;
clutch means including a clutch input and a clutch output for operatively interconnecting said crankshaft and said transmission input shaft;
an oil pump including rotor means rotatable independently of said input gear shaft; and
means for drivingly connecting said clutch input to said rotor means.

2. The organization according to claim 1 wherein said oil pump includes an oil pump case containing said rotor means formed in said one end wall; a closure plate intermediate said oil pump case and said clutch input closing said oil pump case; and said connecting means penetrating said closure plate for connecting said clutch input to said rotor means.

3. The organization according to claim 2 wherein said rotor means comprises an inner rotor and an outer rotor, and said connecting means interconnects said clutch input and said inner rotor.

4. The organization according to claim 3 wherein said rotor means are substantially concentrically disposed about said input gear shaft; an axial opening in said closure plate and said connecting means extending through said axial opening to interconnect said clutch input and said inner rotor.

5. The organization according to claim 4 wherein said connecting means is an Oldham joint.

6. The organization according to claim 1 wherein said one end wall is a partition plate closing the end of said transmission case; a bearing in said partition plate journalling said input gear shaft for rotation; means defining the walls of an oil pump case integrally formed on said partition plate in facing relation to said clutch means; said rotor means surrounding said input gear shaft within said oil pump case; a closure plate closing said oil pump case, said closure plate having an opening for passage of said input gear shaft and said connecting means extending through said opening for connecting said rotor means and said clutch input shaft.

7. The organization according to claim 6 wherein said rotor means comprises an inner rotor and an outer rotor, and said connecting means interconnects said clutch input and said inner rotor.

8. The organization according to claim 7 including a spacer sleeve fixed with respect to said oil pump case concentrically disposed about said input gear shaft; and said inner rotor being mounted for rotation about said spacer sleeve.

9. An oil pump for an internal combustion engine having a transmission including an input gear shaft comprising:
a crank case and a transmission case integrally formed from a casting;
said transmission case having an opening at one end thereof;
a partition plate covering said opening;
means in said partition plate for rotatably supporting said input gear shaft;
a primary driven gear concentric with said input gear shaft;
a crankshaft in said crank case;
a primary drive gear drivingly connecting said crankshaft and said primary driven gear; and
an oil pump on said partition plate concentrically disposed about said input gear shaft.

10. The organization according to claim 9 further comprising clutch means disposed between said primary driven gear and said input gear shaft.

11. The organization according to claim 9 in which said engine crank case contains a main oil gallery, a discharge port from said oil pump, and a lubricating passage extending between said discharge port and said main oil gallery.

12. The organization according to claim 11 wherein said partition plate contains means forming an oil pump chamber housing rotor means, and an inlet port and a discharge port communicating with said chamber.

13. The organization according to claim 10 in which said oil pump is of the trochoidal type including an inner rotor, and joint means interconnecting said inner rotor and said primary driven gear.

14. The organization according to claim 13 wherein said joint means comprises an Oldham joint having one end coupled to said primary driven gear and the other end rotatable with said inner rotor.

15. The organization according to claim 12 wherein said partition plate contains an auxiliary lubricating passage communicating with said oil pump chamber discharge port and operative to conduct lubricant to said transmission.

* * * * *